United States Patent
Warfen et al.

(10) Patent No.: US 12,071,933 B2
(45) Date of Patent: Aug. 27, 2024

(54) METHOD FOR OPERATING A WIND POWER PLANT

(71) Applicant: Siemens Gamesa Renewable Energy Service GmbH, Hamburg (DE)

(72) Inventors: Karsten Warfen, Weede / Söhren (DE); Timo Gosch-Pleß, Osterrönfeld (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 353 days.

(21) Appl. No.: 17/298,190

(22) PCT Filed: Nov. 28, 2019

(86) PCT No.: PCT/EP2019/082938
§ 371 (c)(1),
(2) Date: May 28, 2021

(87) PCT Pub. No.: WO2020/109483
PCT Pub. Date: Jun. 4, 2020

(65) Prior Publication Data
US 2022/0120257 A1  Apr. 21, 2022

(30) Foreign Application Priority Data
Nov. 28, 2018  (DE) ................. 10 2018 009 333.7

(51) Int. Cl.
*F03D 7/02* (2006.01)
(52) U.S. Cl.
CPC ......... *F03D 7/0224* (2013.01); *F03D 7/0272* (2013.01); *F05B 2270/1032* (2013.01);
(Continued)
(58) Field of Classification Search
CPC .................. F03D 7/0224; F03D 7/0272; F05B 2270/327; F05B 2270/328; F05B 2270/335
See application file for complete search history.

(56) References Cited

U.S. PATENT DOCUMENTS

| | | | | |
|---|---|---|---|---|
| 4,160,170 A | * | 7/1979 | Harner | F03D 7/0224 416/37 |
| 4,495,423 A | * | 1/1985 | Rogers | F03D 7/0224 290/55 |

(Continued)

FOREIGN PATENT DOCUMENTS

| | | |
|---|---|---|
| WO | 2006032451 A1 | 3/2006 |
| WO | 2015192853 A1 | 12/2015 |

OTHER PUBLICATIONS

PCT International Search Report and Written Opinion for International Application No. PCT/EP2019/082938 filed Nov. 28, 2019; Date of Mailing: Feb. 14, 2020; 18 pgs.

(Continued)

*Primary Examiner* — Tulsidas C Patel
*Assistant Examiner* — Thomas K Quigley
(74) *Attorney, Agent, or Firm* — Alix, Yale & Ristas, LLP

(57) ABSTRACT

The invention relates to a method for operating a wind power plant, a wind power plant designed to carry out the method, and a corresponding computer program product. In the method for operating a wind power plant comprising a rotor having angle-adjustable rotor blades and a generator rotationally connected thereto and having a controllable torque, the torque of the generator is limited to a maximum value which is linked to the blade pitch angle of the rotor blades such that the maximum value at the switch-on blade pitch angle value is less than or equal to the rated torque value ($M_{Nenn}$) and the maximum value at a rated blade pitch angle which deviates from the switch-on blade pitch angle is equal to the rated torque value ($M_{Nenn}$).

12 Claims, 2 Drawing Sheets

(52) U.S. Cl.
CPC ... *F05B 2270/327* (2013.01); *F05B 2270/328* (2013.01); *F05B 2270/335* (2013.01)

(56) References Cited

U.S. PATENT DOCUMENTS

| | | | | |
|---|---|---|---|---|
| 5,140,170 | A * | 8/1992 | Henderson | F03D 9/28 290/55 |
| 9,835,134 | B2 * | 12/2017 | Esbensen | F03D 7/0224 |
| 2003/0044274 | A1 * | 3/2003 | Deane | F03D 15/00 416/37 |
| 2003/0230898 | A1 * | 12/2003 | Jamieson | F03D 7/0236 290/55 |
| 2006/0273595 | A1 * | 12/2006 | Avagliano | H02P 9/00 290/44 |
| 2008/0042441 | A1 * | 2/2008 | Kabatzke | F03D 7/0272 290/44 |
| 2008/0136188 | A1 * | 6/2008 | Krueger | F03D 7/042 290/44 |
| 2010/0241280 | A1 * | 9/2010 | Garcia Barace | F03D 7/028 290/44 |
| 2012/0056427 | A1 * | 3/2012 | Drossel | F03D 7/0276 290/44 |
| 2012/0096844 | A1 * | 4/2012 | Caldwell | F16H 61/475 60/327 |
| 2012/0211982 | A1 | 8/2012 | Tanabe et al. | |
| 2013/0320674 | A1 * | 12/2013 | Ingram | H02J 3/381 290/43 |
| 2014/0042745 | A1 * | 2/2014 | Perley | H02P 9/04 290/44 |
| 2014/0367967 | A1 | 12/2014 | Ossyra | |
| 2015/0159625 | A1 | 6/2015 | Hardwicke, Jr. et al. | |
| 2017/0268487 | A1 | 9/2017 | Yang et al. | |

OTHER PUBLICATIONS

Lucy Y. Pao, et al., "Control of Wind Turbines", Approaches, Challenges, and Recent Developments, IEEE Control Systems, IEEE, USA, vol. 31, No. 2, Apr. 1, 2011, XP011372740, DOI: 10.1109/MCS.2010.939962, Date of Publication: Mar. 16, 2011, ISSN: 1066-033X, 19 pgs.

German Search Report for Application No. 10 2018 009 333.7; Dated: Oct. 2, 2019; 10 pgs.

"ENERCON wind power plant E-115 3 MW", Enercon Energy for the World, Dated: Aug. 19, 2015, 213 pgs.

Erich Hau; Wind Turbines Fundamentals, Technologies, Application, Economics, 2nd edition; Springer; Library of Congress Control No. 2005929278; ISBN-10-3-540-24240-6 Springer Berlin Heidelberg New York. ISBN—13 978-3-540-24240-6 Springer Berlin Heidelberg New York; Springer-Verlag Berlin Heidelberg 2006; XP-93070462A-1; 4 pgs.

Erich Hau; Wind Turbines Fundamentals, Technologies, Application, Economics, 2nd edition; Springer; Library of Congress Control No. 2005929278; ISBN-10-3-540-24240-6 Springer Berlin Heidelberg New York; ISBN—13 978-3-540-24240-6 Springer Berlin Heidelberg New York; Springer-Verlag Berlin Heidelberg 2006. XP-93070462A-1; 47 pgs.

* cited by examiner

METHOD FOR OPERATING A WIND POWER PLANT

BACKGROUND

The invention relates to a method for operating a wind power plant, and a wind power plant designed for carrying out the method, as well as a corresponding computer program product.

In known wind power plants, a rotor, rotatable about an essentially horizontal axis, with rotor blades arranged thereon, rotatably for adjustment of the blade pitch angle, can be set into rotation by the wind. The rotor is here connected—possibly by way of a rotor shaft and/or a gearbox—to a generator for converting the rotation energy of the rotor into electrical energy. The power-transferring rotating components from the rotor to the generator are referred to together as the drivetrain, and are usually arranged in a nacelle mounted rotatably on a tower.

The operation of such wind power plants can usually be divided into two operating ranges. In a partial load range at wind speeds below the wind speed at which the wind power plant generates its rated power, the blades remain at a constant blade pitch angle setting, while the drive torque is increased in accordance with the available wind until the rated power is reached. If the rated power has already been reached, the drive torque is held constant, and the blade pitch angle of the rotor blades is adjusted in such a way that the permissible rotation speed of the rotor is not exceeded (full load range).

During operation of the wind power plant, in addition to the desired rotation of the rotor, a thrust force that must be entirely absorbed by the tower of the wind power plant also occurs as a result of the wind acting on the rotor. As a result of the turbulences that regularly occur as a result of the interaction between the rotor and the wind, the thrust force to be absorbed varies dynamically, which represents a not insignificant loading for the tower. In methods known to date for operating wind power plants, whose aim is that of an optimum energy yield while adhering to the operating limits of the components of the drivetrain, very high thrust loadings can on occasion occur. The tower must be designed for these high thrust loadings, so that their occurrence does not lead to any direct damage to the tower or to an unwanted reduction in its service life. Towers designed for such high thrust loadings are, however, usually expensive.

SUMMARY OF THE INVENTION

The object of the invention is to create a method for operating a wind power plant and a correspondingly designed control apparatus with which the disadvantages from the prior art no longer occur, or only do so to a reduced extent.

This object is achieved by a method as claimed in the primary claim and by a wind power plant as claimed in the ancillary claim. Advantageous developments are objects of the dependent claims.

The invention accordingly relates to a method for operating a wind power plant comprising a rotor with angularly-adjustable rotor blades and a generator rotationally connected thereto with a controllable torque, wherein the torque of the generator is limited to a maximum value, which is linked to the blade pitch angle of the rotor blades in such a way that the maximum value at the switch-on blade pitch angle is less than or equal to the rated torque value and the maximum value at a rated blade pitch angle that differs from the switch-on blade pitch angle is equal to the rated torque value.

The invention further relates to a wind power plant comprising a rotor with a plurality of rotor blades whose blade pitch angle is adjustable, that is arranged rotatably on a nacelle that is arranged rotatably on a tower and is connected via a drivetrain to a generator arranged in the nacelle for the conversion of wind energy acting on the rotor into electrical energy, and a plant controller for controlling the wind power plant and its components, wherein the plant controller is designed to carry out a method as claimed in the invention.

The invention also relates to a computer program product comprising program sections which, when loaded into a computer, preferably the plant controller of a wind power plant, are designed for carrying out a method as claimed in the invention.

A few terms used in connection with the invention are first explained.

"Blade pitch angle" refers to the value of the angle of the rotor blades about their longitudinal axis with respect to a defined zero position. Frequently, all the rotor blades of a wind power plant have an essentially identical blade pitch angle. It is, however, also possible for the rotor blades of a wind power plant to be set to individual blade pitch angles that differ from one another. For reasons of clarity, it will be assumed in the present application that all of the rotor blades of the wind power plant have the same blade pitch angle or are set to this, without thereby however excluding the possibility of individual blade pitch angle setting.

"Switch-on blade pitch angle" refers to the value of the blade pitch angle to which the rotor blades are set at the switch-on wind speed that is sufficient to set the rotor into rotation from stationary and for the generator to be connected to the grid for feeding in electrical power ("switched on"). The switch-on blade pitch angle can be retained over the entire partial-load range of a wind power plant, or, starting from the switch-on blade pitch angle, the blade pitch angle is varied by a few degrees over the partial load range.

"Rated torque value" refers to the torque of the generator that is present when the wind power plant is at rated power. The "rated power" of the wind power plant is then the electrical power of the wind power plant for which the wind power plant and its components are designed, which, in normal operation, is thus the maximum that can be fed continuously into a power supply grid without damage or the like being expected at the wind power plant or at its components.

"Rated blade pitch angle" refers to the value of the blade pitch angle at which the rated torque value is reached. The rated blade pitch angle here is not usually a constant value, but can vary depending on the operating mode of the wind power plant and/or the loading dynamic described further below. It is, of course, also possible for the rated blade pitch angle to be varied depending on other operating parameters. Starting from the switch-on blade pitch angle, the rated blade pitch angle is usually located in the direction of the feathering position.

The invention has recognized that for operating a wind power plant, it is advantageous, in particular in terms of the thrust loading of the tower of a wind power plant, to be able to change the blade pitch angle of the rotor as dynamically as possible, even in the partial load range, in order, for example, to be able to react quickly to gusts. This is achieved as claimed in the invention in that the torque of the generator is limited to a changeable maximum value over the partial load range between the switch-on blade pitch angle and the rated blade pitch angle. If this maximum value is reached, then with a further increase in the wind the rotation speed of the rotor of the wind power plant would, without any control intervention, necessarily rise due to the torque of the generator not rising further. To prevent this, the rotor blade pitch angle can be changed—usually increased—wherein use can be made for this purpose of rotation speed regulations, known from the prior art, for the full-load range, which usually are highly dynamic.

It is provided as claimed in the invention that the maximum value for the torque at the switch-on blade pitch angle is lower than the rated torque value. Since the maximum value in question is linked as claimed in the invention with the rotor blade pitch angle, the maximum torque corresponds to the rated torque value at the latest when, due to other regulations such as the blade pitch angle regulation depending on the rotation speed, the rotor blade pitch angle adopts a defined rated blade pitch angle that differs from the switch-on blade pitch angle. As soon as the maximum value for the torque is subsequently equal to the rated torque value, the wind power plant is fundamentally able to deliver the rated power when the wind is sufficient. With the method as claimed in the invention, the rotor blades already have a blade pitch angle that differs from the switch-on blade pitch angle on reaching the rated power, which blade pitch angle is preferably the rated blade pitch angle, preferably selected such that the thrust load is reduced in comparison with a blade pitch angle setting in the switch-on blade pitch angle at least at rated power.

It is obvious that according to the method as claimed in the invention, in a wind power plant supplying rated power, as the wind drops the maximum value of the torque is reduced corresponding to the changed blade pitch angle in the direction of the switch-on blade pitch angle—for example due to the falling rotation speed.

As already explained, the blade pitch angle of wind power plants can already be changed depending on the rotation speed with the aid of a controller fundamentally known from the prior art if the rotation speed can no longer be limited by increasing the torque of the generator, since this already corresponds to the instantaneous maximum value. Accordingly, with a torque that corresponds to the maximum value and a falling rotation speed, the blade pitch angle is first changed in the direction of the switch-on blade pitch angle before the torque of the generator is reduced to maintain the rotation of the rotor.

It is also, however, alternatively possible that the blade pitch angle is changed, for example by a specified step or according to a specified scheme, as soon as the generator torque reaches the maximum value resulting at the time from the previously changed blade pitch angle. By directly coupling the blade pitch angle to reaching the maximum value a prompt adjustment of the blade pitch angle can be achieved without having to wait for an ascertainable change in the rotation speed of the rotor which is inertial in this respect.

The link between the maximum value for the torque and the blade pitch angle can be established on the basis of a characteristic curve that is preferably parameterized. The characteristic curve can be represented by one or a plurality of mathematical functions wherein, for example, different functions can apply to different blade pitch angle ranges. It is, however, also possible that the characteristic curve is stored in the form of a characteristic value table, wherein, if necessary, it is possible to linearly interpolate between two respective neighboring characteristic values.

The characteristic curve can, for example for a first blade pitch angle, for example corresponding to the switch-on blade pitch angle, provide a first maximum value and, for a range greater than or equal to a second blade pitch angle provide a constant second blade pitch angle, wherein the maximum value in the range between the first and the second blade pitch angle is changed proportionally, preferably linearly, depending on the blade pitch angle. The initial maximum value for the torque thus remains constant until it is reached by the actual torque, whereupon it is increased depending on the blade pitch angle as the torque continues to rise until the maximum value is equal to the rated torque. Any other characteristic curve profile is, however, also conceivable.

It is preferable if the characteristic curve and/or the rated blade pitch angle is changed depending on the operating mode of the wind power plant and/or the ambient conditions. For this purpose, the parameters—if present—of the characteristic curve can be changed. It is, however, also possible that different characteristic curves that are used in accordance with the instantaneous operating mode, are provided for different operating modes and/or ambient conditions. For example, a characteristic curve with a constant maximum value for the torque for all blade pitch angles can be provided for a safe minimal operation of the wind power plant. The rated blade pitch angle also usually changes as a result of the change to the characteristic curve.

One possible factor that can be employed when changing the characteristic curve is the rotor power dynamic as is described in DE 10 2017 011 318.1. The load dynamic of a wind power plant in reaction to the wind is determined here as the gradient of the sum of the instantaneous acceleration power ($P_{acceleration}$) leading to the acceleration of the drivetrain of a wind power plant from the measured rotation speed ($\omega$) of the drivetrain, and the determination of the instantaneous power transmitted ($P_{transmitted}$) by the drivetrain (10). The instantaneously transmitted power ($P_{transmitted}$) can here be calculated from an instantaneous target torque value ($M_{Soll}$) or from a measured torque ($M_{Mess}$), or can be taken as equal to the measured electrical power ($P_{electric}$) of the wind power plant. The effects of the dynamic loading of the wind power plant arising with the wind impinging on the rotor can be read from the loading dynamic. If the loading dynamic is small, it can be assumed that the wind is steady, while a high loading dynamic leads to the conclusion of a gusty wind. In the first case the maximum value can, for example, be increased in the method as claimed in the invention as a result of the small variations in the thrust loading to be expected, whereas in the latter case a reduction is rather indicated in order to avoid excessive thrust loadings.

The method can in principle use the actual torque of the generator acquired with suitable measuring apparatus and/or the actual blade pitch angle acquired in an appropriate manner. The limitation of the torque of the generator can also in principle, take place directly, for example by manipulating the appropriate controller of the wind power plant. It is, however, preferred if, instead of a measured actual torque and/or an acquired actual blade pitch angle, the target values for precisely these variables that are regularly necessary and therefore present in the plant controller for control purposes are employed. The plant controllers of wind power plants are generally designed to regulate the actual torque to the target torque value, so that, at least in modern plants, only extremely small, negligible deviations between the actual and target torque values result. Similar considerations apply to the actual blade pitch angle and the target blade pitch angle value. Since any deviations between the target and actual values—small as they may be—nevertheless usually vary, it has been found that having recourse directly to the target value of the torque and/or the target value of the blade pitch angle leads to a more robust operation of the wind power plant, since in that way all the inaccuracies in the acquisition of the true actual values are also avoided.

In particular when in the method as claimed in the invention, use is made of target values for the blade pitch angle and torque, and the blade pitch angle is changed on reaching the instantaneous maximum value for the torque depending on the rotation speed of the rotor, it is sufficient if an influence is exercised exclusively on the target torque value by the method as claimed in the invention. By temporarily increasing or reducing the target torque value that is finally converted by the generator and/or the converter linked to it by an offset, the rotor can be accelerated or braked which, with appropriate wind power plant controllers, then entails a predictable change in the blade pitch angle without influence also having to be exercised directly on the blade pitch angle setting for the method as claimed in the invention.

Reference is made to the above remarks for the explanation of the wind power plant as claimed in the invention and the computer program product as claimed in the invention.

BRIEF DESCRIPTION OF THE DRAWINGS

The invention will now be described by way of example on the basis of one preferred embodiment, having reference to the appended drawings, in which.

DETAILED DESCRIPTION

Figure 1:
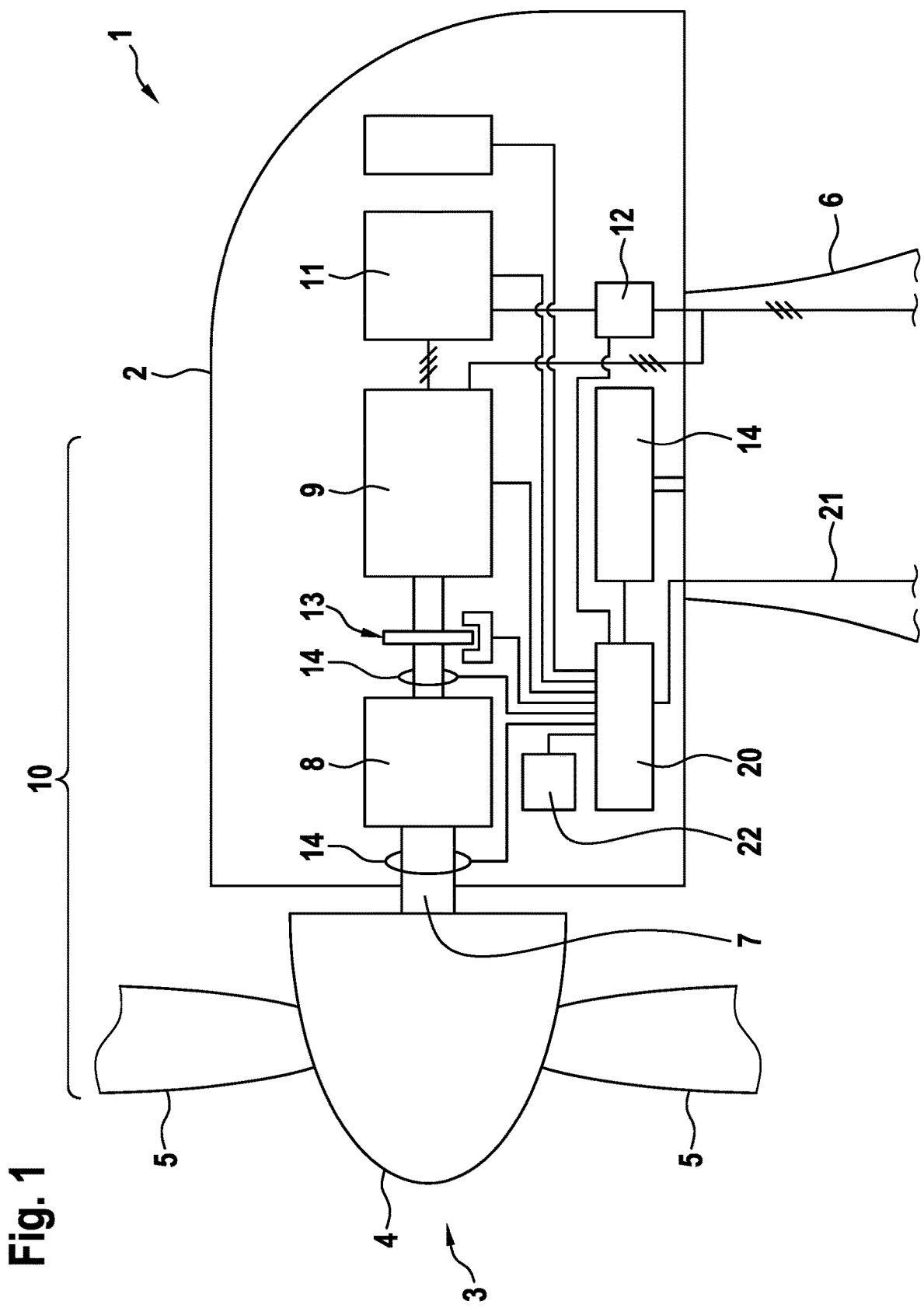
FIG. 1 shows a schematic illustration of the nacelle of a wind power plant as claimed in the invention designed to carry out the method as claimed in the invention.

The nacelle 2 of a wind power plant 1 as claimed in the invention, and therefore designed for carrying out the method as claimed in the invention, is shown schematically in FIG. 1. The wind power plant 1 comprises a rotor 3 with a total of three rotor blades 5 fastened rotatably by way of blade pitch angle adjustment devices (not shown) to a rotor hub 4. The rotor 3 is arranged rotatably at the nacelle 2 which is in turn arranged by way of an azimuth drive 14 rotatably about a vertical axis on a tower 6.

The rotor hub 4 is joined via a rotor shaft 7 via an intermediate gearbox 8 to a generator 9 for converting wind energy acting on the rotor 3 into electrical energy. The components that transmit power from the rotor 3 to the generator 9—that is in particular the rotor shaft 7 and the gearbox 8—form the drivetrain 10.

In the exemplary embodiment illustrated, the generator 9 is a double-fed asynchronous generator in which a part of the generated power is fed directly, and another part of the power via a converter 11 and a switching element 12, to a transformer (not shown) located at the foot of the tower 6 and from there fed into a public supply grid.

Between the gearbox 7 and the generator 9 a brake 13 is furthermore provided with which a rotary movement of the drive train 10 can be braked and, if necessary, the rotor 3 stopped. In addition, measuring transducers 14 are provided for ascertaining the rotation speed of the rotor or the rotation speed of the shaft 7 between the gearbox 8 and the generator 9.

The wind power plant 1 and all of its components are controlled by the computer-based plant controller 20. For this purpose, all of the measured values acquired in the wind power plant 1 are supplied to the plant controller 20, as well as, via a data line 21, target values, for example from a network operator, and, with the aid of control algorithms stored in a memory 22 and in principle known to the expert, converted into control signals which in turn are output to the various components of the wind power plant 1. In a first part, the plant controller 20 ascertains, on the basis of the information that is present, target values for individual parameters of operating the wind power plant 1 that it can control, which are then converted by other parts of the plant controller 20 in such a way that the corresponding actual values correspond to the target values.

As claimed in the invention, the plant controller 20 is designed for carrying out the method as claimed in the invention described below in more detail, for which purpose a computer program product designed for this is stored in the memory 22 and is carried out by the plant controller 20.

Figure 2:
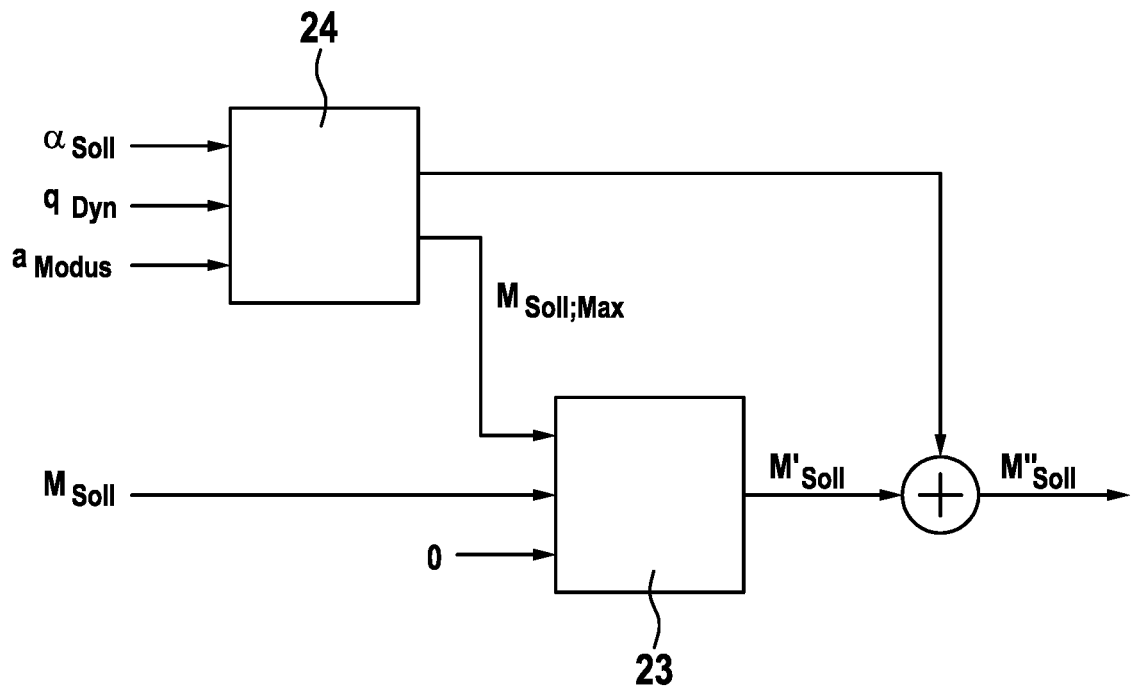
FIG. 2 shows the schematic sketch of one possible performance of the method as claimed in the invention.

A schematic sketch for implementing the method as claimed in the invention in the plant controller 20 is shown in FIG. 2. The illustration is limited here to the part of the plant controller 20 that is significant for carrying out the method.

As already explained, setpoint values for the individual operating parameters of the wind power plant 1 are ascertained by the plant controller 20 on the basis of the captured measured values and other control specifications. These also include setpoint values for the blade pitch angle $\alpha_{Soll}$ and for the generator torque $M_{Soll}$ that are converted by further parts of the plant controller 20, not shown in more detail in FIG. 2, into control commands for the individual components of the wind power plant 1, so that the actual blade pitch angle $\alpha$ and the actual generator torque M correspond to the setpoint values. The plant controller 20 also ascertains, in accordance with DE 10 2017 011 318.1, a normalized loading dynamic $q_{Dyn}$ that adopts values between 0 and 1, and provides information about the turbulences occurring at the wind power plant. Not least, the plant controller 20, and thereby also the wind power plant 1, has different operating modes, for example a normal mode and a safe mode in which the power generation is reduced so that even in the event of malfunctions of the wind power plant 1 it does not have to be completely switched off. The operating mode of the plant controller 20 active at any time is reflected in the value of input signal $a_{Modus}$.

The setpoint value for the torque $M_{Soll}$, which is ascertained in a known manner, is supplied to a setpoint limiter 23 that limits the setpoint $M_{Soll}$ to a value between 0 and a maximum value for the torque $M_{Soll;Max}$.

The maximum value $M_{Soll;Max}$ is ascertained by the calculation module 24, which receives the blade pitch angle setpoint $\alpha_{Soll}$, the setpoint for the torque $M_{Soll}$, the loading dynamic $q_{Dyn}$ and the signal $a_{Modus}$ for the current operating mode as input values.

Figure 3:
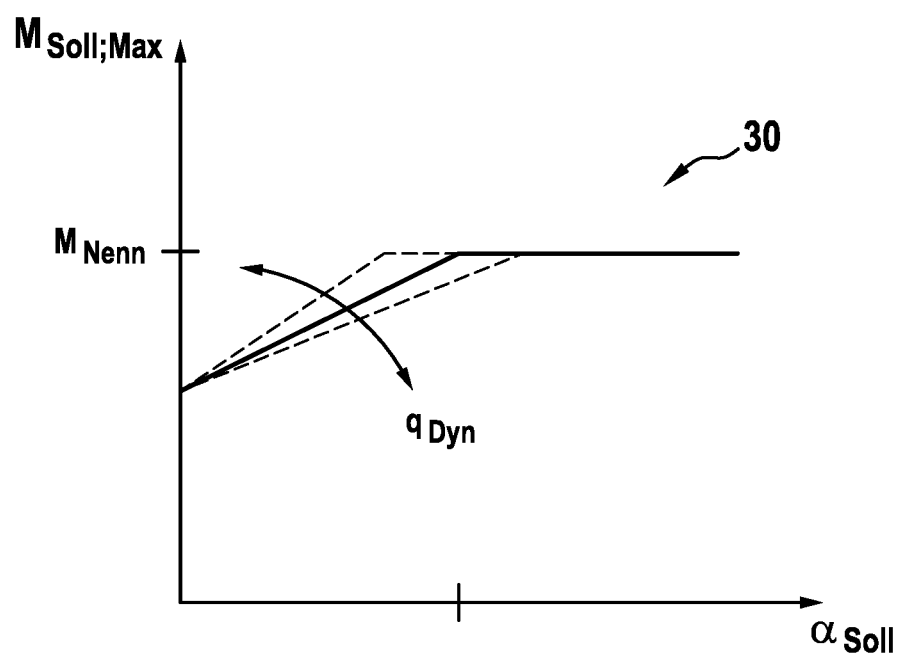
FIG. 3 shows a possible characteristic curve for linking the blade pitch angle to the maximum value for the torque.

For the ascertainment of the maximum value $M_{Soll;Max}$, the calculation module 24 refers to a characteristic curve 30, as illustrated by way of example in FIG. 3. The characteristic curve 30 here represents a direct link between the blade pitch angle or the blade pitch angle setpoint value $\alpha_{Soll}$ and the maximum value for the torque, or its setpoint value $M_{Soll;Max}$. A plurality of different characteristic curves are here stored in the calculation module 24, and are selected and used according to the current operating mode depending on the input signal $a_{Modus}$. A part of these characteristic curves is, furthermore, parameterized, wherein at least one parameter is changed depending on the loading dynamic $q_{Dyn}$.

The characteristic curve 30 in FIG. 3 is configured for the normal operating mode of the wind power plant 1, and can be changed depending on the loading dynamic $q_{Dyn}$.

For the switch-on blade pitch angle that the rotor blades 5 of the wind power plant 1 have so that the rotor is set into rotation from stationary in the presence of sufficient wind (usually 0°), a maximum value for the torque $M_{Soll;Max}$ below the rated torque $M_{Nenn}$ is specified. A blade pitch angle is also specified above which the maximum value for the torque $M_{Soll;Max}$ corresponds in a constant manner to the rated torque $M_{Nenn}$. In the region between the switch-on blade pitch angle and the rated blade pitch angle, above which the maximum value $M_{Soll;Max}$ is specified as the rated torque $M_{Nenn}$, there is a linear relationship between the blade pitch angle setpoint $\alpha_{Soll}$ and the maximum value for the torque $M_{Soll;Max}$. Further characteristic curves can also be specified for other reasons, for example to observe characteristic noise values.

The rated blade pitch angle changes depending on the load dynamic $Q_{Dyn}$. When the load dynamic $q_{Dyn}$ is low, the rated blade pitch angle in question is shifted in the direction of the switch-on blade pitch angle, but in the opposite direction at a high load dynamic $q_{Dyn}$. This is indicated in FIG. 3 by the dashed characteristic curve profiles.

In addition to the characteristic curve 30 illustrated in FIG. 3 for normal operation, a further characteristic curve for safe minimum operation is stored in the calculation module 24. In this characteristic curve 30, the maximum value for the torque $M_{Soll;Max}$ is specified as having a constant value for all blade pitch angles.

The calculation module 24 calculates, on the basis of the characteristic curve applicable for the operating mode at the time, the maximum value for the torque $M_{Soll;Max}$, and provides this to the setpoint limiter 23 as an input value for limiting the setpoint value $M_{Soll}$, from which the setpoint value $M'_{Soll}$, which may be limited to the maximum value $M_{Soll;Max}$, results. This setpoint value $M'_{Soll}$ can now in principle be used for the final control of the generator torque.

In the exemplary embodiment illustrated in FIG. 2, the calculation module 24 is furthermore designed in certain operating modes reflected in the value of input signal $a_{Modus}$ and/or above a certain loading dynamic $q_{Dyn}$, to have an influence on the rotation speed of the rotor 3 of the wind power plant 1 by temporarily increasing and reducing the setpoint value $M'_{Soll}$ ascertained by the setpoint limiter 23 to the setpoint $M''_{Soll}$, which, with appropriate configuration of the plant controller 20 results in the known manner in a change to the blade pitch angle of the rotor blades 5.

The invention claimed is:

1. A method for operating a wind power plant comprising a rotor with angle-adjustable rotor blades and a generator rotationally connected thereto and having a controllable torque, said method comprising:
   limiting the torque of the generator to a changeable maximum setpoint value (MSoll;Max) set by a controller of the wind power plant that is linked to the blade pitch angle of the rotor blades in such a way that the maximum setpoint value (MSoll;Max) of the torque of the generator at the switch-on blade pitch angle is less than a rated torque value (MNenn) of the generator that is present when the wind power plant is at rated power and the maximum setpoint value of the torque of the generator (MSoll;Max) at a rated blade pitch angle that differs from the switch-on blade pitch angle is equal to the rated torque value (MNenn) of the generator.

2. The method of claim 1, comprising changing the blade pitch angle when the maximum setpoint value (MSoll;Max) of the torque of the generator is reached.

3. The method of claim 1, wherein the link between the maximum setpoint value (MSoll;Max) for the torque of the generator and the blade pitch angle is made on the basis of a characteristic curve.

4. The method of claim 1, wherein the blade pitch angle of the rotor blades and the changeable maximum setpoint value (MSoll;Max) of the torque of the generator are regulated toward a blade pitch angle setpoint value (αSoll) and a torque setpoint value (MSoll), wherein the maximum setpoint value (MSoll;Max) limits to the torque setpoint value (MSoll) and is linked to the blade pitch angle setpoint value (αSoll).

5. A wind power plant comprising a rotor with a plurality of rotor blades whose blade pitch angle is adjustable that is arranged rotatably at a nacelle that is arranged rotatably on a tower and is connected via a drivetrain to a generator arranged in the nacelle for the conversion of wind energy acting on the rotor into electrical energy, and a plant controller for controlling the wind power plant and its components, wherein the plant controller is designed to carry out the method of claim 1.

6. The wind power plant of claim 5, wherein the plant controller is designed, on reaching the maximum setpoint value of the torque of the generator (MSoll;Max), to control the blade pitch angle of the rotor blades depending on the rotation speed of the rotor.

7. The wind power plant of claim 6, wherein the plant controller is designed to increase or reduce the torque or a torque setpoint value (MSoll) for a period of time in order to influence the rotation speed of the rotor.

8. A non-transitory computer readable medium comprising program instructions which, if loaded into a computer carry out the method of claim 1.

9. The non-transitory computer readable medium of claim 8, wherein the computer is arranged as the plant controller of a wind power plant.

10. The method of claim 3, wherein the characteristic curve is a parameterized characteristic curve.

11. The method of claim 10, wherein the parameterized characteristic curve and/or the rated blade pitch angle is changed depending on the operating mode of the wind power plant and/or on the ambient conditions.

12. The method of claim 11, wherein the change to the parameterized characteristic curve takes the loading dynamic (qDyn) of the wind power plant into consideration.

* * * * *